US009104965B2

United States Patent
Fritsch et al.

(10) Patent No.: US 9,104,965 B2
(45) Date of Patent: Aug. 11, 2015

(54) VEHICLE WITH COMPUTING MEANS FOR MONITORING AND PREDICTING TRAFFIC PARTICIPANT OBJECTS

(71) Applicant: HONDA RESEARCH INSTITUTE EUROPE GmbH, Offenbach/Main (DE)

(72) Inventors: Jan Fritsch, Mühlheim (DE); Martin Butz, Tübingen (DE); Andreas Alin, Tübingen (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 404 days.

(21) Appl. No.: 13/735,064

(22) Filed: Jan. 7, 2013

(65) Prior Publication Data

US 2013/0179382 A1     Jul. 11, 2013

(30) Foreign Application Priority Data

Jan. 11, 2012 (EP) .................... 12150808

(51) Int. Cl.
*G06F 17/00* (2006.01)
*G06N 5/02* (2006.01)
(Continued)

(52) U.S. Cl.
CPC .............. *G06N 5/02* (2013.01); *B60W 30/095* (2013.01); *B60W 30/12* (2013.01); *B60W 50/14* (2013.01);
(Continued)

(58) Field of Classification Search
None
See application file for complete search history.

(56) References Cited

U.S. PATENT DOCUMENTS

2002/0183960 A1* 12/2002 Chiou et al. .................. 702/150

2010/0057361 A1     3/2010 Caveney et al.
(Continued)

FOREIGN PATENT DOCUMENTS

DE    102007049516 A1    4/2008
JP    2009-223504 A      10/2009
(Continued)

OTHER PUBLICATIONS

Alin, A.; Butz, M.V.; Fritsch, J., "Incorporating environmental knowledge into Bayesian filtering using attractor functions," Intelligent Vehicles Symposium (IV), 2012 IEEE , vol., No., pp. 476,481, Jun. 3-7, 2012.*

(Continued)

*Primary Examiner* — David Vincent
*Assistant Examiner* — David H Kim
(74) *Attorney, Agent, or Firm* — Squire Patton Boggs (US) LLP

(57) ABSTRACT

An anticipatory monitoring and prediction system can include methods for generating effective, accurate predictions of other traffic objects in the vicinity of an ego-car. The invention proposes to combine approximate probability distributions (ADPs) of agent states with Attractor Functions (AFs) for generating distributed probabilistic representations of the potential future states of the observed traffic objects. AFs are selected based on both the current road context, in which the ego-car is situated, and the current states of all participating objects. The generated predictions can be used to filter incoming sensory information for better object state estimations, rate the nature of the behavior of other traffic objects by comparing generated predictions with actual perceived sensor information, or infer accident likelihoods by comparing the predicted state distributions of objects and the ego-car. Warning and information signals or control commands can be issued in a driving assistance system.

11 Claims, 5 Drawing Sheets

(51) Int. Cl.

| | | |
|---|---|---|
| *G06N 7/00* | (2006.01) | |
| *G08G 1/16* | (2006.01) | |
| *B60W 50/14* | (2012.01) | |
| *B60W 30/095* | (2012.01) | |
| *B60W 30/12* | (2006.01) | |
| *B60W 50/00* | (2006.01) | |
| *B60W 40/04* | (2006.01) | |
| *B60W 50/16* | (2012.01) | |

(52) U.S. Cl.
CPC ............... *G06N 7/005* (2013.01); *G08G 1/161* (2013.01); *B60W 40/04* (2013.01); *B60W 50/0097* (2013.01); *B60W 50/16* (2013.01); *B60W 2050/0052* (2013.01); *B60W 2050/0079* (2013.01); *B60W 2050/143* (2013.01); *B60W 2050/146* (2013.01); *B60W 2520/10* (2013.01); *B60W 2550/10* (2013.01); *B60W 2550/402* (2013.01); *B60W 2550/404* (2013.01); *B60W 2550/408* (2013.01)

(56) References Cited

U.S. PATENT DOCUMENTS

| | | | |
|---|---|---|---|
| 2011/0160908 A1* | 6/2011 | Iba | 700/262 |
| 2012/0259808 A1* | 10/2012 | Videen et al. | 706/52 |
| 2012/0259902 A1* | 10/2012 | Videen et al. | 708/443 |

FOREIGN PATENT DOCUMENTS

| | | | |
|---|---|---|---|
| JP | 2011-123714 A | | 6/2011 |
| WO | WO 2008/127465 A1 | | 10/2008 |
| WO | WO 2011/009009 A1 | | 2/2011 |

OTHER PUBLICATIONS

Extended European Search Report dated Mar. 9, 2012 corresponding to European Patent Application No. 12150808.9.

Andreas Alin et al., "Tracking Moving Vehicles Using an Advanced Grid-Based Bayesian Filter Approach," Intelligent Vehicles Symposium (IV), IEEE, Jun. 5, 2011, XP031998981, pp. 466-472.

Stephanie Lefevre et al., "Exploiting Map Information for Driver Intention Estimation at Road Intersections," Intelligent Vehicles Symposium (IV), IEEE, Jun. 5, 2011, XP031998962, pp. 583-588.

Regis Lherbier et al., "Use of Contextual Information by Bayesian Networks for Multi-Object Tracking in Scanning Laser Range Data," Intelligent Transport Systems Telecommunications (ITST), 9th International Conference, IEEE, Oct. 20, 2009, XP031619211, pp. 97-102.

Thrun, S. et al., "Recursive State Estimation," Probabilistic Robotics, Chapter 2, MIT Press, 2005.

Thrun, S. et al., "Nonparametric Filters," Probabilistic Robotics, Chapter 4, MIT Press, 2005.

Matthias Althoff, "Reachability Analysis and its Application to the Safety Assessment of Autonomous Cars," PhD Thesis, Technische Universitat, Munich, Feb. 2010, 221 pages.

Alexander Barth et al., "Where Will the Oncoming Vehicle be the Next Second?" Proceedings of the IEEE Intelligent Vehicles Symposium, Jun. 4-6, 2008, pp. 1068-1073.

Sebastian Brechtel et al., "Probabilistisches Belegtheitsfilter zur Schatzung dynamischer Umgebungen unter Verwendung multipler Bewegungsmodelle," Proceedings of the 21th Fachgesprach Autonome Mobile Systeme, pp. 49-56, 2009.

Tobias Gindele et al., "A Probabilistic Model for Estimating Driver Behaviors and Vehicle Trajectories in Traffic Environments," Intelligent Transportation Systems (ITSC), 13th International IEEE Conference, Sep. 19-22, 2010, pp. 1625-1631.

* cited by examiner

VEHICLE WITH COMPUTING MEANS FOR MONITORING AND PREDICTING TRAFFIC PARTICIPANT OBJECTS

The present invention is related to the application of probability theory for motion control, prediction, and state estimation. The domain of application of the present invention is especially in real-world automotive and robotics environments, such as when driving a car in an inner-city scenario.

The invention focuses in particular on the problem of predicting and analyzing the behavior of other physical (real-world) traffic object from an ego-car perspective. A physical traffic object can be e.g. a vehicle, robot, animal, or human in a relevant vicinity to the ego-car. The ego-car is a car or vehicle, from whose perspective the environment is monitored, using sensors such as e.g. video cameras, for predicting the behavior of the other traffic participants, using a computing unit which is preferably part of the vehicle. Additionally or alternatively remote computing resources, connected to the ego-car via a wireless interface, may be used.

The invention finds application in any air, land or sea traffic. Correspondingly "ego-car" may be a land, sea or air vehicle as well as any combination thereof.

It is known in the state of the art to estimate the current position of such traffic object or to predict a future state of such object. A state of an object is a representation of, for example, the location, the heading direction and/or the speed of said object. Several kinds of techniques are utilized in the state of the art.

The mathematically most correct approaches use the Bayesian probability theory. However, Bayesian estimations are not exactly solvable for continuous states, with the exception of systems having a Gaussian noise distribution and linear state transitions, which can be exactly solved by the well-known Kalman Filter. In engineering applications the Kalman filter is often used in an approximate way.

Increasingly other approximate solutions are used for the Bayesian estimation, such as solutions using the Particle Filter or to a lesser extent the Bayesian Histogram filter (e.g. 'Thrun, S. et al., *Probabilistic Robotics*, MIT Press (2005)').

In all known approaches the real state of an object is never exactly known, since the only information the filter obtains is provided by sensors, which observe noisy and potentially even incorrect state properties. The Bayesian approach takes this into account by using a probability distribution for a state, which represents the probability that a certain internal state is true given a certain sensor input. From this probability distribution of the internal state the real state can be estimated.

This so-called sensor model and the process of inferring the sensory information is called "filter step". In order to use current measurements together with future measurements, the internal state representing all past measurements has to be propagated into the future. This is done by a transition model (comprising a forward-model) that considers system dynamics in a so-called "prediction step".

Some state of the art Bayesian methods use kinematic models as forward-models to predict a future state of an object. Usually the object is represented as a point in geometric space. In order to improve the prediction, JP 2009223504 uses also a shape model of a monitored preceding car as an internal state.

Some approaches additionally use so-called context information to directly adapt the forward-model to verify the sensor information. Context information is information going beyond the current state of an ego-car. For example, other objects in the vicinity of the ego-car or the specific road environment (e.g. road shape, traffic regulation at an intersection etc.) can be considered to represent a context of the ego-car.

For example, DE 102007049516 uses lane information as context information, and weighs the probability of a vehicle presence higher inside a lane area. However, the fact that the lane usually also influences the future behavior of a vehicle is not considered.

Lane information can be also used to generate predictions by means of deterministic, pre-defined trajectories for objects (e.g. Althoff, M., *Reachability analysis and its application to the safety assessment of autonomous cars*, PhD Thesis, Technische Universität München (2010)' or 'Barth, A. & Franke, U., *Where will the oncoming vehicle be the next second?*, Proceedings of the IEEE Intelligent Vehicles Symposium, 1068-1073 (2008)').

Other approaches ignore the problem of setting a trajectory, and rather focus on trajectory processing with the assumption that the trajectory is provided by some other mechanism. For example, WO 2011009009 proposes to generate more than one trajectory, in order to rate the risk of each trajectory with the help of heuristics.

JP 2011123714 (A) uses direction indicator lights to generate a time point of turning as output. However, the document only use relative positions between vehicles, but neither road knowledge nor probability distributions of the monitored agents stated are considered.

WO 2008127465 A1 uses a learning approach to use physiological data of the driver together with the distance between vehicles, the lateral lane position, the steering wheel angle, the longitudinal acceleration, and the velocity, in order to infer a measurement of danger. However, when the deterministic information is combined no ambiguity in the measurements of vehicle positions, distances, velocities, and accelerations is assumed.

US 2010/0057361 A1 uses respective discretized probabilistic predictions of traffic participant states in the form of positions and associated uncertainty values. The discrete predictions are summarized to uncertainty ellipses. In order to estimate appropriate behavior for avoiding collisions between vehicles, the overlap between ellipses of different vehicles is evaluated for generating an appropriate avoidance "force".

'Brechtel, S. et al., Probabilistisches Belegtheitsfilter zur Schätzung dynamischer Umgebungen unter Verwendung multipler Bewegungsmodelle, Proceedings of the 21th Fachgespräch Autonome Mobile Systeme, 49-56 (2009)' and 'Gindele, T. et al., A probabilistic model for estimating driver behaviors and vehicle trajectories in traffic environments, Intelligent Transportation Systems (ITSC), 13th International IEEE Conference on, 1625-1631 (2010)' use dynamic Bayes nets to predict trajectories of traffic participants based on context information. Scripted behaviors are generated a priori for the prediction. Behaviors and local situational context then determine the trajectory probability distribution. However, the situational context is matched to a "finite set of possible situations". Therefore, the algorithm cannot be applied to unforeseen situations that are not included in the set of situations. Further, different potential vehicle states are not differentiated so that different behaviors cannot be applied to different discretized probabilistic states of a vehicle.

The above summary shows that the state of the art techniques can be grouped in deterministic and probabilistic approaches. Some predictive approaches focus on forward projections of the states of other agents, and use current estimated states of other agents for the prediction of future states by simply interpolating the information. Some other predictive approaches generate context-dependent predictions by incorporating context information like e.g. the road course, but usually predict only one (optimal) path trajectory or a restricted set of alternative path trajectories, and do not allow for multiple context influences at the same time.

The present invention aims to overcome the drawbacks of the above-discussed state of the art, and particularly aims to exploit context information to directly adapt the forward-model for the transition model of the prediction. The present invention aims for allowing multiple influences at the same time. The present invention desires in general to provide an improved prediction of the behavior of other real-world objects, e.g. traffic participant objects. The traffic security is to be improved and additional mechanisms for safety in automated control programs and systems are to be provided.

To achieve the above-mentioned goals, the present invention utilizes a technical system mounted on-board of an ego-car, which observes the surrounding scene, e.g. the road outline (e.g. curves, crossings etc.) and the locations of other real-world objects, using sensors such as e.g. video cameras which supply signals to a computing unit, which is preferably on-board. Further, ego-car parameters (e.g. parameters indicating self-motion) can be obtained, for example, from a CAN bus of the ego-car. Road outline and state information about other objects can also be inferred from map knowledge, GPS, vehicle-to-vehicle communication, radar, and camera. All information can be considered to represent the context that influences the behavior of the different traffic participant objects. Thus, this information is referred to as context information.

The general idea of the present invention is to utilize this context information to monitor and predict the behavior of other traffic participant objects. In this manner the present invention is intended to serve driver assistance systems and autonomous vehicle control systems. The system may either derive proper driving behaviors to safely control the car, or the system may issue warnings and other informative signals in a driver assistance system. Automatic lane following systems or warning systems for an expected lane departure are examples of such systems, respectively.

In particular the present invention is directed to a method for predicting a state of at least one traffic participant object, the method including steps of determining, using information supplied from sensors, an approximate probability distribution of a current state of the at least one object, and predicting a future state of the at least one object by updating the approximate probability distribution using standard Bayesian filtering concepts, the method being characterized by using at least one attractor function to modify the predicting step, wherein each attractor function represents a potential state trajectory from the current state to a potential future state determined according to context information.

Each object state is represented by an approximate probability distribution (APD). A state of an object may comprise at least its location and its velocity. An ADP is a probability distribution representing the potential states of the object or agent in an approximate way. Most applicable to the invention are discretized APDs, but also modular, continuous APDs (such as Gaussian Mixture Models) can be used. Different techniques are applicable for discretized ADPs, e.g. probability grids or particles, where each node or particle represents a certain probability mass.

By taking into account a particular current object state with an associated probability mass and further taking into account the current road and traffic context, potential intentional object behaviors can be deduced by inferring attractors and corresponding attractor functions (AFs).

The considered traffic context information may comprise factors such as potential vehicle maneuvers, road conditions, crossing situations, traffic signs, or intention-indicators sent-out by the monitored agent (such as turn-signal indicators or information provided by vehicle-to-vehicle (V2V) communication). The context information may comprise lane knowledge, which may be provided by any type of sensor such as a camera, a radar sensor, or a GPS together with a road map database or by a combination of more than one sensor.

An attractor is a potential (intentional) goal state of an agent, such as a future location, a heading direction and/or a speed combination. An AF is a function that translates a goal state (attractor) and a starting state (current state) into the most likely state space trajectory for the object to reach the attractor.

The state space trajectory is used to modify the classical projection of the agent state into the future. The modified projection can then be absorbed by the subsequent approximate probability distribution. The resulting predictive representations of object states can be used to infer dangerous and unusual situations and agents. The inferences may be used for informing a controller of the ego-car about critical situations, or for issuing preventive control commands if necessary. The present invention can also utilize probability maps that allow capturing of ambiguous agent states to infer risk or danger by computing the overlap in probability masses of the ego-car and other monitored agents.

Preferably, the method further includes a step of sensing with sensors for providing context information about surrounding objects for the at least one attractor function, wherein the sensors are such as one or more cameras, radars, laser scanners, and/or Vehicle-to-Vehicle communication systems.

Preferably, the method further includes a step of environment sensing with sensors for providing context information about the static environment for the at least one attractor function, wherein the sensors are such as one or more cameras, radars, laser scanners, GPS/navigation systems, or Infrastructure-to-Vehicle communication systems.

Preferably, the method further includes steps of performing continuously a plurality of future state predictions for the at least one object, and filtering each prediction with incoming sensory information, in order to obtain an improved determination of a new current state of the at least one object.

Preferably, a difference between a predicted future state and an observed future state of the at least one object enables the system to classify the behavior of the monitored object as normal or unusual.

Preferably, the prediction of the future state of the at least one object resulting in a predicted approximate probability distribution can be used to derive likely trajectories of movement for the at least one object.

Preferably, a comparison of the observed future state with the probability distribution of the current state can be used to infer which attractor function dominated the behavior of the at least one object.

Preferably, as a function of the predicted future state of the at least one object, a visual or acoustic signal is generated, or an effector of a vehicle, such as a steering wheel, an accelerator, or a brake, is operated. Additionally or alternatively the state of safety devices of the vehicle, such as e.g. safety belt pre-tensioning devices, may be altered as a function of the predicted future state of the at least one object.

Preferably the method is used for robotics safety in corresponding control systems.

The present invention is further directed to a device for predicting a state of at least one object, wherein the device comprises means for determining an approximate probability distribution of a current state of the at least one object, and means for predicting a future state of the at least one object by updating the approximate probability distribution using standard Bayesian filtering concepts, the device being characterized by being adapted to use at least one attractor function to modify the predicting step, wherein each attractor function represents a potential state trajectory from the current state to a potential future state determined according to context information.

The focus of the above-described method lies in monitoring the behavior of surrounding agents by combining (a) APDs, which represent potential current and future agent states, with (b) AFs, which dynamically influence the distributed flow of the state probabilities towards potential future goal states.

The application of AFs to the object states is not defined a priori but depends on the context, where context comprises (a) the current state of the environment (e.g. a road crossing or a curved road) and (b) the current potential states of the agent. The AFs can be chosen freely given the road information and are independent of the estimated agent states. In this way, a non-deterministic vehicle state in form of a probability distribution can be projected into the future taking into account given context information, which determines the current attractors and corresponding AFs.

The method of the present invention yields more accurate probability distributions of the potential future states of other traffic participants (where "future" is expected to lie in the range of seconds). Such a prediction is highly useful for both driver assistance systems and autonomous vehicle control systems.

In the following, the present invention is explained in more detailed steps and is illustrate with figures.

It is to be understood that all of the following processing may be performed by a on-board computing unit of a land, air or sea vehicle, which preferably is a car, motorcycle or scooter.

The vehicle furthermore is provided with at least one sensor, preferably a camera, which supplies signals to the computing unit and on the basis of which the computing unit can produce representations of the state(s) of one or more traffic participant object present in the input field of the sensor. The state may be defined by one or more of the following parameters:
location
direction, and
speed (as well as any derivative thereof).

Figure 1:
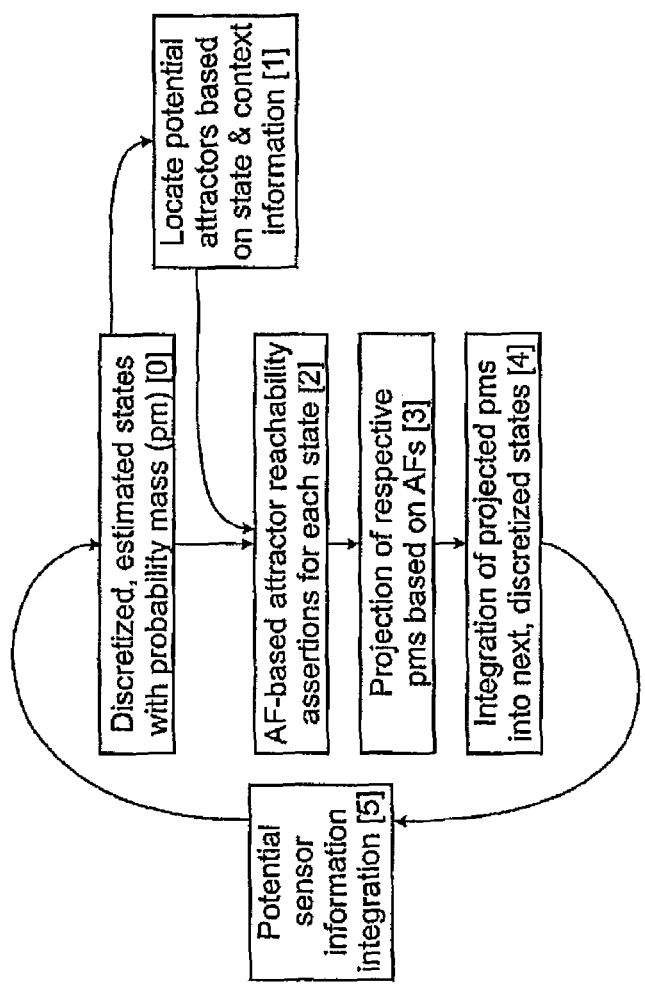
FIG. 1 illustrates information flow during prediction, as performed by a computing unit of a vehicle.

FIG. 1 shows iterative steps [0] to [5] of a proposed method for generating predictions. In step [0] the ego-car represents the states of other vehicles by suitable approximate probability distribution ("APDs"). One example thereof are discretized probability distributions, wherein each discretized state has a certain probability mass, which specifies the probability that the agent is actually in this state. The state estimation of an object may comprise at least its location and velocity, but may be additionally endowed with higher order derivatives (potentially of several orders) of this information as well as with respective variance estimates.

For example, a grid may be distributed on the surface of the environment monitored using the sensor(s). Each grid point may additionally include mean and variance velocity estimates. The probability mass thus essentially estimates the probability that the object is in the vicinity of a grid node and, if so, its velocity estimate is distributed according to the velocity mean and variance estimates.

Maps and street information are often sufficiently available. This kind of information, but also sensor-based information, allows in step [1] the determination of potential driving goals (i.e. attractors), which are dynamically determined dependent on the context. Driving goals may be rather simple, such as following a road or entering a side road at the next crossing. Such anticipations of the (potentially alternative) intentions and corresponding goals of other agents are used to predict likely immediate future positions and velocities.

In step [2], before generating the forward predictions, the method determines dynamically, which potential goal state(s) may be reached from which discretized state with an associated probability mass. Potential goal-based attractors preferably apply to a state estimate only, if the goal state is in a certain distance range within the current state. This restriction of the influence of attractors can ensure that the attractors modify the states only locally.

The AFs are used to determine the most appropriate state space trajectory starting from the current state and ending in the goal state, such as for example one with the least accelerations. Preferably, if there is no possible state space trajectory below a certain acceleration value, then the AF of this goal state is not considered for the particular starting state. The AFs can be applied to determine the projection of the probability mass, i.e. distributing the probability mass according to the likelihood of each goal state and corresponding AF.

Figure 2:
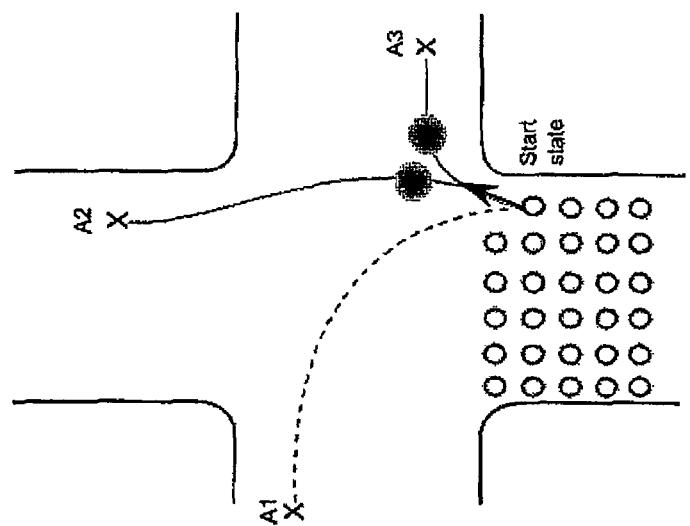
FIG. 2 shows an example of a crossing scene.

FIG. 2 illustrates several starting (current) states of an ego-car. For one start state the potential attractors that apply to this particular state are determined. The process is preferably applied to each discretized state estimate (i.e. the other grid points depicted in grey).

After determining the responsible AFs for a state estimate, in step [3] the associated probability mass can be projected to the next iteration (t+1). The probability mass may evolve into two or more smaller distributions, dependent on the number and directions determined by the AFs in combination with the respective state estimates. If no AF applies, then preferably the state-respective probability mass is forward-projected without AF consideration like in a classical state of the art prediction scheme.

FIG. 2 illustrates the probability mass projection step, which is done for each discretized state estimate. In particular, FIG. 2 particularly shows an example of a crossing scene with localized, discrete states indicated by circles. Dependent on the start state (black circle), the likelihood of attractor states is determined. In this case, attractor state A1 cannot be reached given the current start state (i.e. the current position, velocity, and direction of the object). For the two remaining attractor states A2 and A3, the attractor functions (solid lines leading to A2 and A3) are used for projecting the probability mass of the start state. The projected probability mass resulting from the combination of AF and state estimate results in the two probability spots along the attractor functions.

Figure 3:
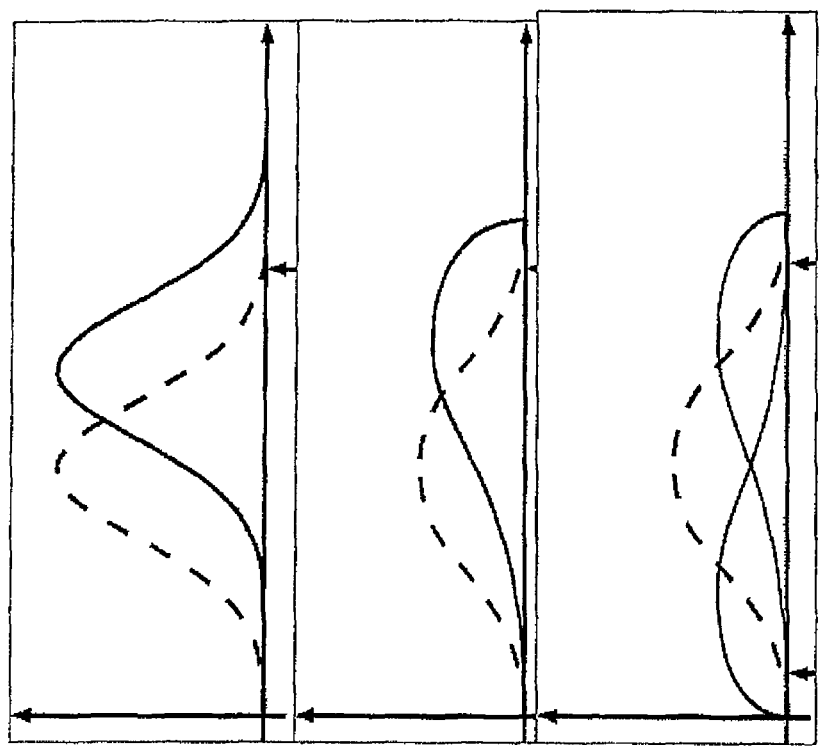
FIG. 3 shows different examples of the manipulation of a feed-forward-based probability distribution.

In order to use the information of the AFs to influence the forward model, the feed-forward function is adapted. Different possible solutions are practicable. A Bayesian fusion of the AF with a kinematic forward model can be accomplished in various ways (FIG. 3). To do so, the AF-derived state space trajectory is used to modify the state-based heading direction and velocity dimensions. In FIG. 3 different examples of the manipulation of the feed-forward-based probability distribution given a certain state estimate (dashed distributions) due to given attractor states and resulting AFs (arrows) are shown to yield a modified distribution (solid distributions). In the top of FIG. 3 a simple manipulation of direction (x-Axis) is shown. In the center of FIG. 3 a direction manipulation with consideration of maximum steering angle is shown. In the bottom of FIG. 3 a distribution split due to two alternative attractors is shown.

In step [4] the projected probability masses are finally absorbed by the successive APD. For example, the discretized states in the grid absorb all projected partial probability masses that overlap. The overlapping ones are summed up and they also determine the means and variances of the corresponding resulting velocity estimates. In particular, means and variances of the velocity estimate can be determined by averaging the incoming respective velocities weighted by the respective partial probability masses. Variances can be determined in a similar manner.

In step [5] the absorbed probability masses may be used to execute the process over several iterations, generating further-reaching predictions. At any iteration, the predicted states may be compared with new sensory information given a probabilistic sensory model. This information may be incorporated into the system state by adapting the probability mass in each node using Bayesian sensor fusion. That is, the predicted state is filtered by the incoming sensory information. The filtering-prediction cycle is additionally illustrated in FIG. 4.

Figure 4:
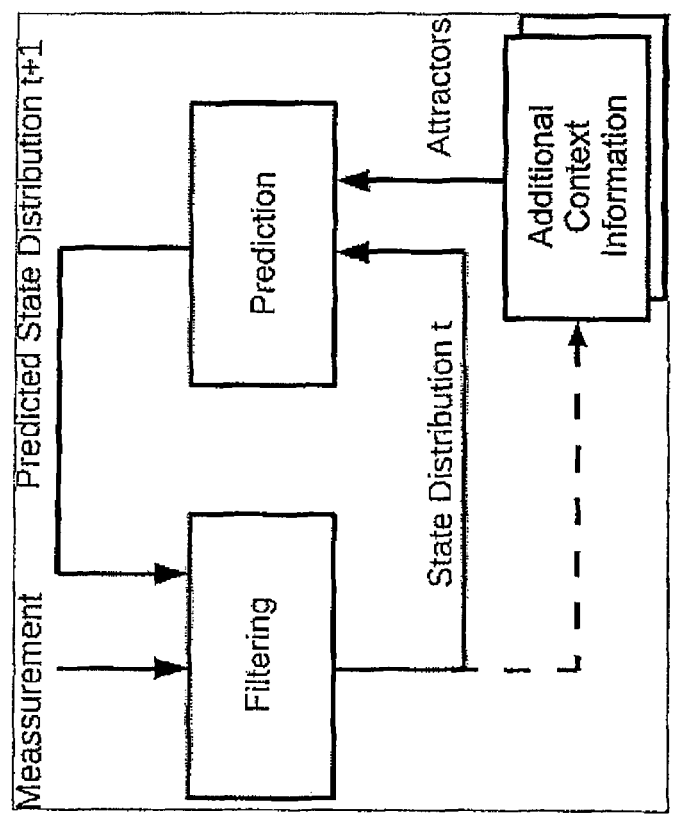
FIG. 4 shows an information flow with filtering.

In FIG. 4 iterative steps are proposed for monitoring agents. A filter stage combines measurements with predicted state information. A prediction step considers feed-forward predictions based on agent state information as well as context-dependent AFs. Due to the approximate, discretized probability distribution, feed-forward and attractor-based information is combined locally for each potential state (e.g. a node in a grid or a particle in a particle filter approach). The result is a distributed representation of expected vehicle states that can then be again filtered given the next available measurements.

Figure 5:
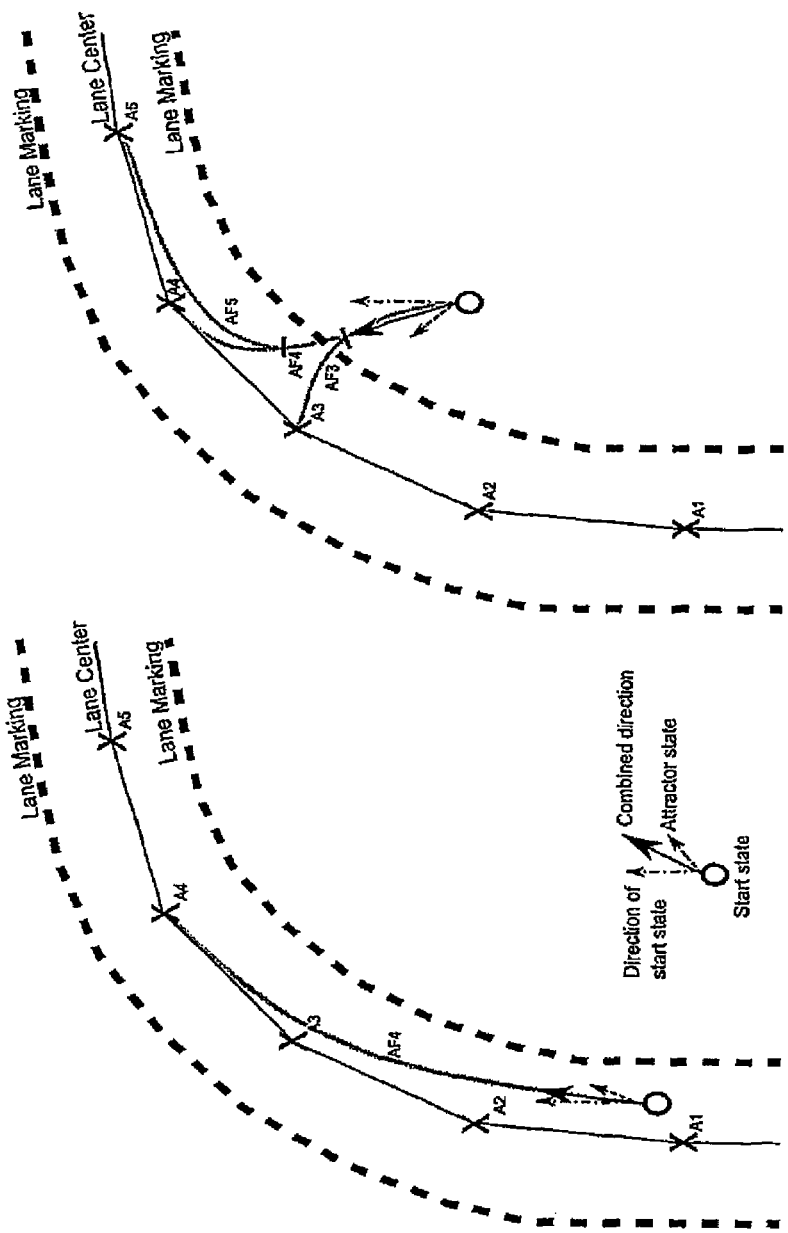
FIG. 5 shows concrete examples of attractors that determine targeted direction with a lane-following AF.

As explained above, the present invention suggests a method and device using additional context information to improve the prediction step beyond the state information. Additional context information in the form of potential goals can be used to directly adapt the forward-model. To do so, the present invention proposes the usage of the AFs. These AFs are applicable to any possible state representation. They depend only on the respective state estimate and the intended goal. FIGS. 2, 3, and 5 illustrate the general concept of an AF and examples of AFs. FIGS. 2 and 3 show how an AF may change the state-based heading direction given one or two attractors.

FIG. 5 shows a specific example of a lane-based AF. For states located outside of the lane, the AF determines the direction of how to enter the lane. States within the lane are attracted towards the center of the lane with additional velocity consideration, thus modifying the estimated heading direction and speeds given by a state estimate (cf. FIG. 3 for illustrative adaptation effects). In the example in FIG. 5 a total of five attractors were defined exemplarily to represent the curved road shape.

In particular FIG. 5 shows concrete examples of attractors that determine the targeted direction with a lane-following AF. The direction of the start state refers to the feed-forward direction information contained in the start state, and the direction of the attractor state refers to the direction resulting from the relevant attractor (e.g. A4 in the left part of FIG. 5). The thin lines indicate the most likely trajectory determined by the combination of start state and attractor state, i.e. the resulting attractor function. On the left-hand side in FIG. 5 a car location is within a lane with A4 as relevant attractor state. On the right hand side an example of a car entering a lane is shown. Here the initial relevant attractor is A3 and the resulting trajectory is AF3. When getting closer to the lane and A3, the relevant attractor switches to A4 (indicated by small black line) and the attractor function AF4 now dominates the trajectory of the vehicle. Finally, when the vehicle gets onto the lane, A5 becomes the relevant attractor, and the attractor function AF5 symbolizes the predicted future trajectory.

Note that the attractor examples provided in FIG. 5 represent the road shape, but the proposed invention is not limited to representation of the static environment. For example, an attractor can also be used to represent a lane change on a highway, if there is an entry lane with new traffic entering the highway, requiring the vehicles driving on the highway to make space for the newly entering vehicles. Another type of attractor may represent an evasion space if the ordinary driving path cannot be followed due to some other vehicle blocking the path. In general, the proposed concept of attractors applies to representing any goal state of a (moving) agent. For any practical application, the number and state (position) of attractors has to be defined based on additional requirements like, e.g., the targeted smoothness of trajectories and the computational effort.

Additional information such as turn signals or vehicle-to-vehicle communication may be used to weigh the likelihoods of competing AFs. Such information will be used to distribute the probability masses proportionally to the likelihoods of the applicable AFs. FIG. 2 illustrates the distribution of the probability masses and FIG. 3 illustrates how the heading direction may be influenced.

Another feature of the present invention is that the above-described method can also run iteratively without filtering by means of new sensory information. Without using AFs, the probability flow would in this case follow the kinematic constraints only, and it would not be sharpened by the incoming sensory information. Consequently, a prediction without AFs would result in a quickly diffusing probability distribution. For carrying out longer-term predictions without sensory information, the incorporation of AFs constrains the probability flow to more likely areas. If such a long-term prediction uses incorrect model assumptions (the AFs), the comparison to the actual sensory information at the predicted future time will show large differences (a "surprise" compared to the assumptions)—and thus the fast detection of dangerous, unexpected situations. Correct model assumptions will lead to better predictive performance, monitoring of other agents, and compensation of faulty and noisy sensory information.

Several deductions about the monitored traffic are possible with the method proposed by the present invention. The simplest one is the continuous filtering of sensory information for generating more accurate state estimations. More accurate state estimations of other agents can again be used to better determine the maximally appropriate ego-car control or also to deduce more effective and valid warning signals.

Besides normal filtering, the predictive state estimations can also be used to rate the behavior of other agents. Ratings can range from normal behavior, given the sensed state information is in general accordance with the predictions, to erratic behavior, given the sensed state information violates the predictions in a significant way, possibly measured over several iterations. Moreover, the behavior may be rated "unpredictable" if the behavior is in absolute violation of the predictions. These ratings may be again used to issue valid warning signals or to influence the ego-car control.

Finally, predicted state estimations of several cars as well as of the predicted ego-car state can be used to infer the criticality of the situation. That is, situations may be rated on a "danger" scale dependent on the overlap of predicted probability masses of the potential states of the respective agent states. Strong overlap indicates a strong danger for an accident, whereas nearly no overlap corresponds to a generally safe situation. Again, this information may be used to issue informative (warning) signals or to influence the ego-car control.

A device performing the proposed method will be useful to improve traffic security as well as to provide an additional mechanism for safety in automatized agent control programs.

In summary the invention proposes the distributed, dynamic combination of APDs of agent states with AFs for improving the prediction of the future states of the monitored agents. AFs allow the incorporation of context information (e.g. road course, intersection) beyond kinematic models used typically for the agent itself. The combination with APDs allows the selective application of different AFs in different sub-spaces of the probability distribution.

The novel technique for generating locally discretized probability distributions of agents in the environment by including context in the form of AFs may be used a) to monitor surrounding traffic participants (agents) in an automotive scenario by continuously generating such predictions for each agent and filtering the predictions with the incoming sensory information.
b) to detect unusual or dangerous situations by generating predictions for a future point in time and later at this future time point comparing the predictions with corresponding sensory information. Based on the difference between predicted and observed agent states, inferences can be drawn about the monitored agent.
c) to infer the current behavior of an agent: if several different attractor functions are applicable (like e.g. driving straight or turning left), the comparison of the observed state with the probability distribution allows to infer which attractor function dominated the agent state (i.e., which attractor the agent followed), thus indicating the current behavioral intention of the agent.
d) to derive likely agent state trajectories from the prediction of a future point in time and use this information for the inference of own control strategies like, e.g., warning the driver of risky driving maneuvers or performing collision avoidance maneuvers.

The present invention is targeted for driver assistant systems, autonomous vehicles, and autonomous robotics applications in general. Agents may be other vehicles, including cars, busses, trucks, but also bicyclists, as well as animals and humans. In the robotics domain in general, similar prediction techniques may be used for the above agents as well as for predicting the states of other robots.

The invention claimed is:

1. A method for predicting a state of at least one physical traffic object, the method including the steps of:
    generating sensorial information, based on the sensorial information, computing an approximate probability distribution of a current state of the at least one object represented in the sensorial information, and
    predicting a future state of the at least one object by updating the approximate probability distribution using standard Bayesian filtering concepts,
    the method being characterized by
    using at least one attractor function to modify the predicting step,
    wherein each attractor function represents a potential state trajectory from the current state to a potential future state determined according to context information.

2. The method according to claim 1, further including a step of
    sensing with sensors for providing context information about surrounding objects for the at least one attractor function,
    wherein the sensors are such as one or more cameras, radars, laser scanners, and/or Vehicle-to-Vehicle communication systems.

3. The method according to claim 1, further including a step of
    environment sensing with sensors for providing context information about the static environment for the at least one attractor function,
    wherein the sensors are such as one or more cameras, radars, laser scanners, GPS/navigation systems, or Infrastructure-to-Vehicle communication systems.

4. The method according to claim 1, further including steps of
    performing continuously a plurality of future state predictions for the at least one object, and filtering each prediction with incoming sensory information, in order to obtain an improved determination of a new current state of the at least one object.

5. The method according to claim 1,
    wherein a difference between a predicted future state and an observed future state of the at least one object enables the system to classify the behavior of the monitored object as normal or unusual.

6. The method according to claim 1,
    wherein the prediction of the future state of the at least one object resulting in a predicted approximate probability distribution can be used to derive likely trajectories of movement for the at least one object.

7. The method according to claim 1,
    wherein a comparison of the observed future state with the probability distribution of the current state can be used to infer which attractor function dominated the behavior of the at least one object.

8. The method according to claim 1,
    wherein, as a function of the predicted future state of the at least one object, a visual or acoustic signal is generated, or an effector of a vehicle, such as a steering wheel, an accelerator, or a brake, is operated.

9. The method according to claim 1,
    wherein the method is used for robotics safety in corresponding control systems.

10. A device for predicting a state of at least one object, wherein the device comprises:
    Sensor means, preferably camera means, means, functionally connected to be supplied with signals from the sensor means, for determining an approximate probability distribution of a current state of the at least one object sensed by the sensor means, and
    means for predicting a future state of the at least one object by updating the approximate probability distribution using standard Bayesian filtering concepts,
    the device being characterized by
    being adapted to use at least one attractor function to modify the predicting step,
    wherein each attractor function represents a potential state trajectory from the current state to a potential future state determined according to context information.

11. Land, air or sea vehicle, preferably a car or motorcycle, provided on-board with a device of claim 10.

* * * * *